US006436573B1

(12) United States Patent
Goto et al.

(10) Patent No.: US 6,436,573 B1
(45) Date of Patent: Aug. 20, 2002

(54) NON-AQUEOUS ELECTROLYTE SECONDARY CELL, NEGATIVE ELECTRODE THEREFOR, AND METHOD OF PRODUCING NEGATIVE ELECTRODE

(75) Inventors: Shusaku Goto, Moriguchi; Kaoru Inoue, Kadoma; Yui Takahashi, Osaka; Toyoji Sugimoto, Fujiidera, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/367,523

(22) PCT Filed: Dec. 15, 1998

(86) PCT No.: PCT/JP98/05653

§ 371 (c)(1),
(2), (4) Date: Aug. 16, 1999

(87) PCT Pub. No.: WO99/31747

PCT Pub. Date: Jun. 24, 1999

(30) Foreign Application Priority Data

Dec. 16, 1997 (JP) .............................................. 9-346039
Nov. 30, 1998 (JP) ........................................... 10-338714

(51) Int. Cl.⁷ ............................ H01M 4/62; H01M 4/58
(52) U.S. Cl. .................................... 429/217; 429/231.8
(58) Field of Search ............................... 429/231.8, 217

(56) References Cited

U.S. PATENT DOCUMENTS

| | | | |
|---|---|---|---|
| 5,286,582 A | 2/1994 | Tahara et al. | |
| 5,426,006 A | 6/1995 | Delnick et al. | |
| 5,432,029 A | 7/1995 | Mitate et al. | ........... 429/194 |
| 5,510,212 A | 4/1996 | Delnick et al. | |
| 5,658,692 A | 8/1997 | Ohsaki et al. | |
| 5,672,446 A * | 9/1997 | Barker et al. | |
| 6,020,087 A * | 2/2000 | Gao | |

FOREIGN PATENT DOCUMENTS

| | | |
|---|---|---|
| JP | 61-91871 | 5/1986 |
| JP | 4-255670 | 9/1992 |
| JP | 4-363866 | 12/1992 |
| JP | 6-349482 | 12/1994 |
| JP | 7-307153 | 11/1995 |
| JP | 9-35707 | 2/1997 |
| JP | 9-199135 | 7/1997 |
| JP | 9-199135 A * | 7/1997 |
| JP | 9-289022 | 11/1997 |

OTHER PUBLICATIONS

Internet Printout. http://www.polysciences.de/polymer_cat/poly_AtoZ.html. P. 3.*
Search Report Corresponding to application no. PCT/JP98/05653 dated Mar. 23, 1999.
Austrialian Search Report, dated May 12, 2000, application no. 9903922–4.

* cited by examiner

Primary Examiner—Patrick Ryan
Assistant Examiner—Tracy Dove
(74) Attorney, Agent, or Firm—RatnerPrestia

(57) ABSTRACT

Graphite material capable of absorbing and desorbing lithium is employed as the negative electrode material of a non-aqueous electrolyte secondary battery, the negative electrode material being bound by at least one type of material selected from the group consisting of polyethylene, ethylene-vinyl acetate copolymer, ethylene-propylene copolymer, ethylene-propylene-vinyl acetate copolymer, and polypropylene. A non-aqueous electrolyte secondary battery with a high anti-peeling strength of the electrode mix, superiority in the ease of handling, a high reliability in mass production, a superior low-temperature discharge characteristic and cycle characteristic is provided by employing the negative electrode in combination with a rechargeable positive electrode and a non-aqueous liquid electrolyte.

22 Claims, 1 Drawing Sheet

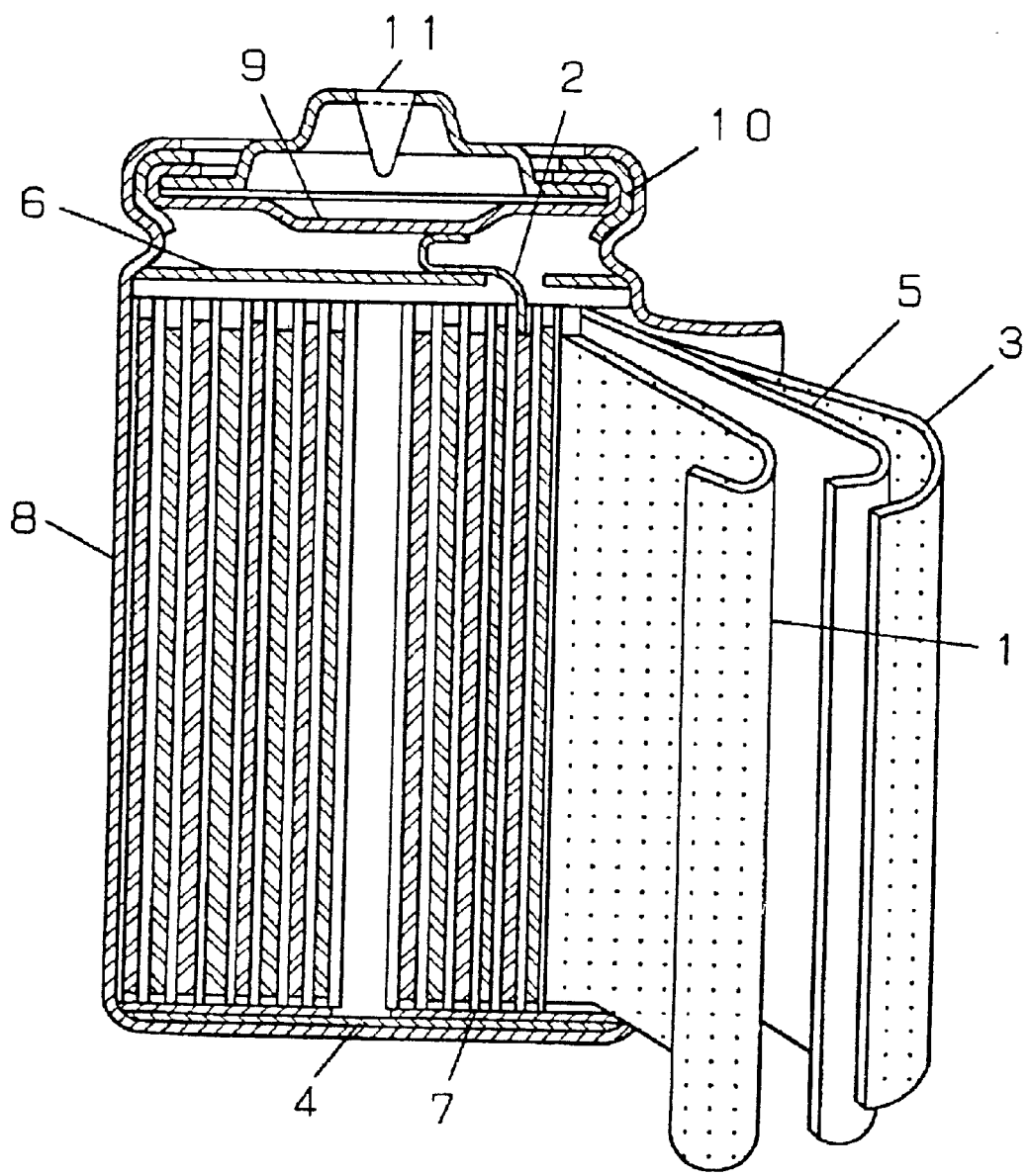

NON-AQUEOUS ELECTROLYTE SECONDARY CELL, NEGATIVE ELECTRODE THEREFOR, AND METHOD OF PRODUCING NEGATIVE ELECTRODE

This application is a U.S. National Phase application of PCT International application PCT/JP98/05653.

FIELD OF THE INVENTION

The present invention relates to a non-aqueous electrolyte secondary battery, a negative electrode therefor, and method of manufacturing the negative electrode.

BACKGROUND OF THE INVENTION

In recent years, non-aqueous electrolyte secondary batteries have been drawing attention as high output, high energy-density power sources and many research works are being conducted.

Among the non-aqueous electrolyte secondary batteries, lithium secondary batteries have heretofore been drawing attention and studied. Lithium secondary batteries employ as the positive active material lithiated transition metal oxides such as $LiCoO_2$, $LiNiO_2$ and chalcogen compounds such as $MoS_2$. These materials have a layer structure in which lithium ions can be reversibly inserted and detached. On the other hand, as the negative active material, metallic lithium has been employed. However, when metallic lithium is employed in the negative active material, lithium dissolution and deposition reaction is repeated with the repetition of charge and discharge, resulting in the formation of dendritic lithium on the surface of lithium. The formation of dendritic lithium causes problems of decreasing charge-discharge efficiency and a possible risk of causing short circuit by piercing the separator and getting in contact with the positive electrode.

In order to solve these problems, lithium alloy plate, metal powders, graphite or other carbon based (amorphous) materials, metal oxides, or metal sulfides, which can reversibly absorb and desorb lithium are being studied as an alternative negative electrode material to metallic lithium.

However, with the use of a lithium alloy plate, there has been a problem that charge-collecting capability of the alloy decreases with repetition of deep charge and discharge due to becomin fine of the alloy thus lowering the charge-discharge cycle life characteristic. On the other hand, when metal powders and powders of carbon materials, metal oxides or metal sulfides are employed, binders are usually added as an electrode can not be formed with these materials alone. Regarding carbon materials, for example, a method of forming an electrode by adding an elastic rubber-based polymer as the binder is disclosed in Japanese Laid-Open Patent Application No. Hei 4-255670. With metal oxides and metal sulfides, an electrically conducting material is also added to increase conductivity in addition to adding a binder.

When using a carbon material as the negative electrode, the carbon material is usually pulverized into powder and an electrode is formed by using a binder. When a highly crystalline graphite material is used as the carbon material, a battery with a higher capacity and higher voltage is obtained compared with a battery using other carbon materials. However, when a graphite material is pulverized, the powder tends to show flaky configuration. When a negative electrode is formed using this material, as the planar portions of the flaky graphite particles which are not involved in the insertion-detaching reaction of lithium are oriented in parallel to the plane of the electrode, the high-rate discharge characteristic declines. Furthermore, when a conventional rubber-based polymer material is employed as the binder, the binder covers the graphite particles thus hindering lithium insertion-detaching reaction, drastically lowering the high-rate discharge characteristic of the battery, especially the discharge characteristic at low temperatures.

Also, as the force of binding with the metallic core material is weak, it is necessary to add a large quantity of the binder, which further declines the high-rate discharge characteristic. Conversely, when the quantity of addition of the binder is reduced, problems arise such as an increase in the failure rate due to peeling of the electrode mix in the manufacturing process as the force of binding is weak, or a poor charge-discharge cycle characteristic due to low resistance to liquid electrolyte of the rubber-based polymer binder, and a sufficient characteristic has not yet been achieved.

Also, during the pressing process of an electrode, there is a problem in that the graphite particles slide in the direction of pressing thus breaking bonds of the binder and decreasing the strength of the electrode.

The present invention addresses these problems and provides batteries having a superior high-rate discharge characteristic, especially the discharge characteristic at low temperatures, and a superior charge-discharge cycle characteristic in a large quantity and with stability.

SUMMARY OF THE INVENTION

An object of the present invention is to provide a negative electrode which is strong against peeling of the negative electrode mix, superior in the ease of handling, high in reliability during mass production process, and further, superior in low-temperature discharge characteristic and cycle characteristic, and to provide a non-aqueous electrolyte secondary battery employing the negative electrode.

In accomplishing the object, in a negative electrode for a non-aqueous electrolyte secondary battery, the negative electrode comprising a carbon material which can reversibly absorb and desorb lithium and a binder, the present invention employs as the binder of the above negative electrode material at least one type of material selected from the group consisting of polyethylene, polypropylene, ethylene-vinyl acetate copolymer, ethylene-propylene copolymer, and ethylene-propylene-vinyl acetate copolymer. The present invention further provides a non-aqueous electrolyte secondary battery comprising a rechargeable positive electrode, a non-aqueous liquid electrolyte, and employing the above-described negative electrode.

Also, the present invention employs as the binder of the above negative electrode material at least one type of material selected from the group consisting of polyethylene, polypropylene, polyacrylic acid, acrylate, polymethyl acrylic acid, polymethacrylic acid, methacrylate, and polymethyl methacrylic acid. The present invention further provides a non-aqueous electrolyte secondary battery comprising a rechargeable positive electrode and a non-aqueous liquid electrolyte, and employing the above-described negative electrode.

Further, the present invention employs as the binder of the above-described negative electrode material at least one type of material selected from the group consisting of polyethylene, polypropylene, ethylene-acrylic acid copolymer, ethylene-acrylate copolymer, ethylene-methylacrylic acid copolymer, ethylene-methacrylic acid copolymer, ethylene-methacrylate copolymer, and ethylene-methylmethacrylic acid copolymer. The present invention further provides a non-aqueous electrolyte secondary battery comprising a rechargeable positive electrode and a non-aqueous liquid electrolyte, and employing the above-described negative electrode.

Also, the present invention employs as the binder of the above-described negative electrode material at least one type of material selected from the group consisting of polyethylene, polypropylene, ethylene-propylene-acrylic acid copolymer, ethylene-propylene-acrylate copolymer, ethylene-propylene-methylacrylic acid copolymer, ethylene-propylene-methacrylic acid copolymer, ethylene-propylene-methacrylate copolymer, and ethylene-propylene-methyl methacrylic acid copolymer.

The present invention further provides a non-aqueous electrolyte secondary battery comprising a rechargeable positive electrode and a non-aqueous liquid electrolyte, and employing the above-described negative electrode.

Yet further, the present invention employs as the binder of the above-described negative electrode material at least one type of material selected from the group consisting of polyethylene, polypropylene, ethylene-acrylic acid-styrene copolymer, ethylene-acrylate-styrene copolymer, ethylene-methyl acrylic acid-styrene copolymer, ethylene-methacrylic acid-styrene copolymer, ethylene-methacrylate-styrene copolymer, ethylene-methyl methacrylic acid-styrene copolymer, ethylene-propylene-acrylic acid-styrene copolymer, ethylene-propylene-acrylate-styrene copolymer, ethylene-propylene-methylacrylic acid-styrene copolymer, ethylene-propylene-methacrylic acid-styrene copolymer, ethylene-propylene-methacrylate-styrene copolymer, and ethylene-propylene-methyl methacrylic acid-styrene copolymer. The present invention further provides a non-aqueous electrolyte secondary battery comprising a rechargeable positive electrode and a non-aqueous liquid electrolyte, and employing the above-described negative electrode.

In a preferred embodiment of the present invention wherein the negative electrode material of a non-aqueous electrolyte secondary battery comprises a carbon material which is capable of absorbing and desorbing lithium and a binder, the carbon material is high-crystallinity graphite and at least one type of material selected from the group consisting of polyethylene, polypropylene, ethylene-vinyl acetate copolymer, ethylene-propylene copolymer, and ethylene-propylene-vinyl acetate copolymer is employed as the binder of the negative electrode.

In other preferred embodiment of the present invention, as the binder of the negative electrode material at least one type of material selected from the group consisting of polyethylene, polypropylene, polyacrylic acid, acrylate, polymethyl acrylic acid, polymethacrylic acid, methacrylate, and polymethyl methacrylic acid is used. Additionally, by substituting a part or the whole of —COOH radical of the acrylic acid and methacrylic acid with —COO⁻Na⁺, K⁺ and the like to obtain acrylate and methacrylate, a negative electrode with a further superior electrode strength can be obtained.

In a yet other preferred embodiment of the present invention, as the binder of the negative electrode material, at least one type of material selected from the group consisting of polyethylene, polypropylene, ethylene-acrylic acid copolymer, ethylene-acrylate copolymer, ethylene-methyl acrylic acid copolymer, ethylene-methacrylic acid copolymer, ethylene-methacrylate copolymer, and ethylene-methyl methacrylic acid copolymer is used. Additionally, by substituting a part or the whole of the —COOH radical of the acrylic acid and methacrylic acid with —COO⁻Na⁺, K⁺ and the like to obtain acrylate and methacrylate, a negative electrode with a further superior electrode strength can be obtained.

In a still further preferred embodiment of the present invention, as the binder of the negative electrode material, at least one type of material selected from the group consisting of polyethylene, polypropylene, ethylene-propylene-acrylic acid copolymer, ethylene-propylene-acrylate copolymer, ethylene-propylene-methyl acrylic acid copolymer, ethylene-propylene-methacrylic acid copolymer, ethylene-propylene-methacrylate copolymer, and ethylene-propylene-methyl methacrylic acid copolymer is used. Additionally, by substituting a part or the whole of the —COOH radical of the acrylic acid and methacrylic acid with —COO⁻Na⁺, K⁺ and the like to obtain acrylate and methacrylate, a negative electrode with a further superior electrode strength can be obtained.

In a still further preferred embodiment of the present invention, as the binder of the negative electrode material, at least one type of material selected from the group consisting of polyethylene, polypropylene, ethylene-acrylic acid-styrene copolymer, ethylene-acrylate-styrene copolymer, ethylene-methyl acrylic acid-styrene copolymer, ethylene-methacrylic acid-styrene copolymer, ethylene-methacrylate-styrene copolymer, ethylene-methyl methacrylic acid-styrene copolymer, ethylene-propylene-acrylic acid-styrene copolymer, ethylene-propylene-acrylate-styrene copolymer, ethylene-propylene-methyl acrylic acid-styrene copolymer, ethylene-propylene-methacrylic acid-styrene copolymer, ethylene-propylene-methacrylate-styrene copolymer, and ethylene-propylene-methyl methacrylic acid-styrene copolymer is used. Additionally, by substituting a part or the whole of the —COOH radical of the acrylic acid and methacrylic acid with —COO⁻ Na⁺, K⁺ and the like to obtain acrylate and methacrylate, a negative electrode with a further superior electrode strength can be obtained.

In the present invention, when ethylene-acrylic acid (or acrylate) copolymer, ethylene-methyl acrylic acid copolymer, ethylene-methacrylic acid (or methacrylate) copolymer or ethylene-methyl methacrylic acid copolymer is employed as the binder, it is preferable to make the ethylene content in the range 70%–95%. This is because when the ethylene content is less than 70%, the low-temperature discharge characteristic declines significantly, and the strength of the electrode decreases when the ethylene content exceeds 95%.

The preferred range of the average particle size of the graphite material to be used as the negative material of the present invention is 5–30 $\mu$m. This is because when the average particle size is 5 $\mu$m or smaller, the irreversible capacity of the graphite material increases thus decreasing the battery capacity, and when the average particle size is greater than 30 $\mu$m, the low-temperature discharge characteristic declines.

Furthermore, the preferred content ratio of the binder to 100 parts by weight of the carbon material is between 0.5 to 8 parts by weight. This is because when the content ratio of the binder is below 0.5, sufficient electrode strength is not obtained whereas the low-temperature discharge characteristic declines when the ratio is beyond 8.

Also, the negative electrode of the present invention is rendered more superior and desirable in the electrode strength by heat treatment at a temperature between the melting point and the decomposition temperature of the binder after a mixture of the carbon material and the binder has been coated on a current collector, dried, and pressed, or by pressing at a temperature between the melting point and the decomposition temperature of the binder. This is because the binder of the negative electrode of the present invention melts during pressing or during heat treatment after pressing and solidifies again thus enhancing the binding property. The effect is more pronounced especially when heat treated during pressing because of the applied pressure. This effect has not been observed with the conventional rubber-based polymers.

In configuring a non-aqueous electrolyte secondary battery employing the negative electrode of the present invention, lithiated transition metal oxides such as $LiCoO_2$, $LiNiO_2$, $LiMn_2O_4$, etc., can be used as the positive electrode material. As the liquid electrolyte, a solution prepared by dissolving an electrolyte salt such as $LiPF_5$, $LiBF_4$, etc., into a mixed solvent of a cyclic carbonate such as ethylene carbonate and a chain carbonate such as ethylmethyl carbonate and the like may be used.

As has been described above, the present invention provides a negative electrode which is superior in low-temperature discharge characteristic and in non-peeling strength of the electrode mix and, by using the negative electrode, it provides a non-aqueous electrolyte secondary battery which is superior in the ease of handling during mass production, high in reliability, and superior in discharge characteristic.

BRIEF DESCRIPTION OF THE DRAWINGS

FIG. 1 is a vertical cross-sectional view of a non-aqueous electrolyte secondary battery in an embodiment of the present invention.

DESCRIPTION OF THE PREFERRED EMBODIMENTS

Referring to a drawing, a description of exemplary embodiments of the present invention will be given in the following.

EXAMPLE 1

FIG. 1 shows a vertical cross sectional view of a cylindrical battery used in the present invention. In the figure, a positive electrode 1 is prepared by mixing $LiCoO_2$ as the active material and acetylene black as an electrically conducting agent, and additionally, polytetrafluoroethylene as a binder at a weight ratio of 100:3:7, making paste by using a thickener, coating the paste on both sides of an aluminum foil, drying, and pressing, then cutting to predetermined dimensions (37 mm×350 mm). In addition, an aluminum lead 2 is welded to a positive electrode 1. Negative electrode 3 is prepared by mixing flaky graphite as the carbon material and polyethylene as a binder at a predetermined ratio, coating paste made by using a thickener on both sides of a copper foil, drying, and pressing, then cutting to predetermined dimensions (39 mm×425 mm). Flaky graphite having average particle sizes of 1, 5, 20, 30, and 40 μm was used. The mixing ratios of polyethylene as the binder were 0.5, 5, 8, and 10 parts by weight relative to 100 parts by weight of the carbon material. A nickel lead 4 is welded to the negative electrode 3, too. A separator 5 made of a microporous polyethylene film is interposed between the positive electrode 1 and negative electrode 3, all of which are spirally wound to form an electrode group. After disposing insulating plates 6 and 7 made of polypropylene respectively on the top and bottom ends of the electrode group, the electrode group is inserted into a case 8 made of nickel-plated iron. Subsequently, a positive lead 2 and a negative lead 4 are respectively welded to a seal plate 9 provided with a safety vent and to the bottom of the case 8. Further, a liquid electrolyte prepared by dissolving lithium hexafluorophosphate as an electrolyte into a 1:3 volume ratio mixed solvent of ethylene carbonate and ethylmethyl carbonate to a concentration of 1.5 mol/L is added, sealed with the seal plate 9 with the intervention of a gasket 10 to obtain battery A1 of the present invention. Numeral 11 is the positive terminal of the battery and the case 8 is also serving as the negative terminal. The battery measures 17 mm in diameter and 50 mm in height.

The negative electrode was pressed at two temperature points of 25 degrees C. and 130 degrees C., and was subsequently dried at 130 degrees C.

EXAMPLE 2

Battery A2 of the present invention was fabricated in the same manner as in Example 1 with the exception of using ethylene-vinyl acetate copolymer as the negative electrode binder.

EXAMPLE 3

Battery A3 of the present invention was fabricated in the same manner as in Example 1 with the exception of using ethylene-propylene copolymer as the negative electrode binder.

EXAMPLE 4

Battery A4 of the present invention was fabricated in the same manner as in Example 1 with the exception of using ethylene-propylene-vinyl acetate copolymer as the negative electrode binder.

EXAMPLE 5

Battery A5 of the present invention was fabricated in the same manner as in Example 1 with the exception of using polypropylene as the negative electrode binder.

EXAMPLE 6

Battery B1 of the present invention was fabricated in the same manner as in Example 1 with the exception of using polyacryl acid as the negative electrode binder.

EXAMPLE 7

Battery B2 of the present invention was fabricated in the same manner as in Example 1 with the exception of using polymethyl acrylic acid as the negative electrode binder.

EXAMPLE 8

Battery B3 of the present invention was fabricated in the same manner as in Example 1 with the exception of using polymethacrylic acid as the negative electrode binder.

EXAMPLE 9

Battery B4 of the present invention was fabricated in the same manner as in Example 1 with the exception of using polymethyl methacrylic acid as the negative electrode binder.

EXAMPLE 10

Battery C1 of the present invention was fabricated in the same manner as in Example 1 with the exception of using ethylene-acrylic acid copolymer as the negative electrode binder.

EXAMPLE 11

Battery C2 of the present invention was fabricated in the same manner as in Example 1 with the exception of using ethylene-methyl acrylic acid copolymer as the negative electrode binder.

EXAMPLE 12

Battery C3 of the present invention was fabricated in the same manner as in Example 1 with the exception of using ethylene-methacrylic acid copolymer as the negative electrode binder.

EXAMPLE 13

Battery C4 of the present invention was fabricated in the same manner as in Example 1 with the exception of using ethylene-methyl methacrylic acid copolymer as the negative electrode binder.

EXAMPLE 14

Battery D1 of the present invention was fabricated in the same manner as in Example 1 with the exception of using ethylene-propylene-acrylic acid copolymer as the negative electrode binder.

EXAMPLE 15

Battery D2 of the present invention was fabricated in the same manner as in Example 1 with the exception of using ethylene-propylene methyl acrylic acid copolymer as the negative electrode binder.

EXAMPLE 16

Battery D3 of the present invention was fabricated in the same manner as in Example 1 with the exception of using ethylene-propylene-methacrylic acid copolymer as the negative electrode binder.

EXAMPLE 17

Battery D4 of the present invention was fabricated in the same manner as in Example 1 with the exception of using ethylene-propylene-methyl methacrylic acid copolymer as the negative electrode binder.

EXAMPLE 18

Battery E1 of the present invention was fabricated in the same manner as in Example 1 with the exception of using ethylene-acrylic acid-styrene copolymer as the negative electrode binder.

EXAMPLE 19

Battery E2 of the present invention was fabricated in the same manner as in Example 1 with the exception of using ethylene-methyl acrylic acid-styrene copolymer as the negative electrode binder.

EXAMPLE 20

Battery E3 of the present invention was fabricated in the same manner as in Example 1 with the exception of using ethylene-methacrylic acid-styrene copolymer as the negative electrode binder.

EXAMPLE 21

Battery E4 of the present invention was fabricated in the same manner as in Example 1 with the exception of using ethylene-methyl methacrylic acid-styrene copolymer as the negative electrode binder.

EXAMPLE 22

Battery E5 of the present invention was fabricated in the same manner as in Example 1 with the exception of using ethylene-propylene-acrylic acid-styrene copolymer as the negative electrode binder.

EXAMPLE 23

Battery E6 of the present invention was fabricated in the same manner as in Example 1 with the exception of using ethylene-propylene-methyl acrylic acid-styrene copolymer as the negative electrode binder.

EXAMPLE 24

Battery E7 of the present invention was fabricated in the same manner as in Example 1 with the exception of using ethylene-propylene-methacrylic acid-styrene copolymer as the negative electrode binder.

EXAMPLE 25

Battery E8 of the present invention was fabricated in the same manner as in Example 1 with the exception of using ethylene-propylene-methyl methacrylic acid-styrene copolymer as the negative electrode binder.

COMPARATIVE EXAMPLE

Comparative Example battery F of the present invention was fabricated in the same manner as in Example 1 with the exception of using styrene-butadiene copolymer as the negative electrode binder.

Comparison of the low-temperature discharge characteristic, electrode strength of the negative electrode, and charge-discharge cycle characteristic was carried out on the above 26 types of batteries, namely, A1–A5, B1–B4, C1–C4, D1–D4, E1–E8, and F each using a different negative electrode binder.

Battery capacity was determined by discharging at a constant discharge current of 180 mA until a discharge termination voltage of 3.0 V is reached after a constant-current constant-voltage charging at a charging current of 630 mA at a charging voltage of 4.2 V for a charging time of 2 hours in a 20 degrees C. environment. The low-temperature discharge characteristic was assessed by discharging at a constant discharge current of 900 mA until a discharge termination voltage of 3.0 V is reached after a constant-current constant-voltage charging at a charging current of 630 mA at a charging voltage of 4.2 V for a charging time of 2 hours in a −20 degrees C. environment. Strength of the negative electrode was tested by applying 1.5 cm-square cellophane adhesive tape on the surface of the negative electrode and measuring the force required to peel off the negative electrode mix, which force is then compared with that of Comparative Example battery F which is defined to be unity. The relative values thus obtained are shown in Table 1 as the electrode strength. The larger the electrode strength is, the stronger the negative electrode mix is against peeling. The charge-discharge cycle test was carried out in a 20 degrees C environment by repeating constant-current constant-voltage charging at a charging current of 630 mA at a charging voltage of 4.2 V for a charging time of 2 hours and constant-current discharging at a discharging current of 900 mA until a discharge termination voltage of 3.0 V is reached, and obtaining the number of cycles reached until the discharge capacity decreased to 50% of the initial battery capacity.

Table 1 shows the low-temperature discharge capacity, electrode strength, and charge-discharge cycle characteristic of Example batteries A1–A5 and Comparative Example battery F. The data is for the case of an average particle size of flaky graphite of 20 μm and a binder content of 5 parts by weight relative to 100 parts by weight of the carbon material.

TABLE 1

| Battery | A1 | | A2 | | A3 | | A4 | | A5 | | F | |
|---|---|---|---|---|---|---|---|---|---|---|---|---|
| Rolling Temperature (deg C.) | 25 | 130 | 25 | 130 | 25 | 130 | 25 | 130 | 25 | 130 | 25 | 130 |
| Discharge Capacity at −20 deg C. (mAh) | 282 | 355 | 307 | 360 | 273 | 340 | 310 | 355 | 285 | 359 | 44 | 47 |
| Electrode Strength | 1 | 2 | 1 | 2 | 1 | 2 | 1 | 2 | 2 | 3 | 1 | 1 |
| Number of Cycles (cycles) | 721 | 736 | 508 | 511 | 711 | 720 | 515 | 522 | 702 | 713 | 447 | 430 |

As indicated in Table 1, all of the Example batteries A1–A5 were superior to Comparative Example battery F in the low-temperature discharge characteristic. This may be attributable to a lower degree of carbon particle coverage with the binder compared with Comparative Example battery F. In other words, the styrene-butadiene copolymer used in Comparative Example battery F as the binder has a high film-forming ability as its glass transition temperature is as low as 0 degree C. or below and its particle size is on the order of sub-$\mu$m, and, as a result, the binder has a tendency of thinly covering the entire carbon particle even though the mixing ratio is the same when compared with the negative electrode binder of the present invention.

With regard to the electrode strength, all of the Example batteries A1–A5 of the present invention showed equal or better strength than Comparative Example battery F. Furthermore, in the case pressing was performed at 130 degrees C., a negative electrode with a further superior electrode strength was obtained because the binder of the present invention melts during pressing and solidifies again under the state of being pressed.

With regard to the charge-discharge cycle characteristic, Example batteries A1–A5 showed a characteristic superior to Comparative Example battery F. This may be attributable to superior liquid electrolyte-resistance of the binder used in these batteries as it does not contain double bonds in the primary chain of the polymer and is chemically less reactive with the liquid electrolyte compared with the styrene-butadiene copolymer binder used in the Comparative Example battery F.

Table 2 shows the relationships between the average particle size of flaky graphite and battery capacity and between the average particle size of flaky graphite and low-temperature discharge characteristic in Example batteries A1–A5 of the present invention and Comparative Example battery F. The data is for the case of a binder content of 5 parts by weight to 100 pats by weight of the carbon material. Pressing was carried out at 25 degrees C.

TABLE 2

| Battery | Average Particle Size of Flaky Graphite ($\mu$m) | Battery Capacity (mAh) | Discharge Capacity at −20 deg C. (mAh) |
|---|---|---|---|
| A1 | 1 | 872 | 321 |
| | 5 | 920 | 301 |
| | 20 | 932 | 282 |
| | 30 | 938 | 271 |
| | 40 | 943 | 119 |
| A2 | 1 | 852 | 332 |
| | 5 | 910 | 322 |
| | 20 | 925 | 307 |
| | 30 | 930 | 290 |
| | 40 | 941 | 120 |
| A3 | 1 | 879 | 319 |
| | 5 | 916 | 302 |
| | 20 | 936 | 273 |
| | 30 | 942 | 260 |
| | 40 | 951 | 111 |

TABLE 2-continued

| Battery | Average Particle Size of Flaky Graphite ($\mu$m) | Battery Capacity (mAh) | Discharge Capacity at −20 deg C. (mAh) |
|---|---|---|---|
| A4 | 1 | 846 | 329 |
| | 5 | 900 | 319 |
| | 20 | 919 | 310 |
| | 30 | 925 | 286 |
| | 40 | 938 | 119 |
| A5 | 1 | 876 | 330 |
| | 5 | 919 | 318 |
| | 20 | 939 | 285 |
| | 30 | 942 | 272 |
| | 40 | 949 | 115 |
| F | 1 | 859 | 79 |
| | 5 | 913 | 61 |
| | 20 | 935 | 44 |
| | 30 | 938 | 20 |
| | 40 | 945 | 3 |

As can be seen in Table 2, when the average particle size of the flaky graphite is smaller than 5 $\mu$m, the battery capacity decreases remarkably as the irreversible capacity of the carbon material of the negative electrode increases, and when greater than 30 $\mu$m, the low-temperature discharge characteristic declines, suggesting that an average particle size of flaky graphite in the range 5–30 $\mu$m is preferable. Table 3 shows the relationships between the binder content in parts by weight relative to 100 parts by weight of the carbon material of the negative electrode and the low-temperature discharge characteristic and between the binder content in parts by weight relative to 100 parts by weight of the carbon material of the negative electrode and the electrode strength of Example batteries A1–A5 of the present invention and Comparative Example battery F. The data is for the case of an average flaky graphite particle size of 20 $\mu$m. Pressing was carried out at 25 degrees C.

TABLE 3

| Battery | Binder Content | Discharge Capacity at −20 deg C. (mAh) | Electrode Strength |
|---|---|---|---|
| A1 | 0.5 | 320 | <1 |
| | 5 | 282 | 1 |
| | 8 | 269 | 3 |
| | 10 | 144 | 4 |
| A2 | 0.5 | 339 | <1 |
| | 5 | 307 | 1 |
| | 8 | 291 | 3 |
| | 10 | 145 | 3 |
| A3 | 0.5 | 315 | <1 |
| | 5 | 273 | 1 |
| | 8 | 254 | 3 |
| | 10 | 152 | 4 |

TABLE 3-continued

| Battery | Binder Content | Discharge Capacity at −20 deg C. (mAh) | Electrode Strength |
|---|---|---|---|
| A4 | 0.5 | 345 | <1 |
|  | 5 | 310 | 1 |
|  | 8 | 298 | 2 |
|  | 10 | 146 | 3 |
| A5 | 0.5 | 326 | 1 |
|  | 5 | 285 | 2 |
|  | 8 | 256 | 4 |
|  | 10 | 150 | 4 |
| F | 0.5 | 58 | =0 |
|  | 5 | 44 | 1 |
|  | 8 | 19 | 2 |
|  | 10 | 2 | 2 |

It can be seen from Table 3 that when the content in parts by weight of the binder relative to 100 parts by weight of the carbon material is greater than 8 in the Examples of the present invention, the low-temperature discharge characteristic remarkably declines, and when it is less than 0.5 the electrode strength decreases not necessarily to zero, resulting in electrode failure such as peeling of the electrode mix. Therefore, it is preferable to make the content of the binder in parts by weight relative to 100 parts by weight of the carbon material in the range 0.5 to 8.

Additionally, when the temperature of heat treatment after pressing of the negative electrode is equal to or below the melting point of the negative electrode binder, enough electrode strength can not be obtained because the binder does not melt, and at or above the decomposition temperature of the binder, the binder decomposes and the electrode strength decreases. As a result, by heat treatment of the negative electrode at a temperature between the melting point and the decomposition temperature of the binder, an electrode with a superior electrode strength can be obtained. Same thing is applicable to the temperature of pressing of the negative electrode.

Though use of one type of binder has been shown in each of the examples of the present invention, it is apparent that use of a mixture of two or more types of binder will give similar result.

Table 4 shows the low-temperature discharge characteristic, electrode strength and charge-discharge cycle characteristic of Example batteries B1–B4 of the present invention and Comparative Example battery F. The data is for the case of an average flaky graphite particle size of 20 $\mu$m and the binder content of 5 parts by weight relative to 100 parts by weight of the carbon material.

As shown in Table 4, all of Example batteries B1–B4 of the present invention were superior to Comparative Example battery F in the low-temperature discharge characteristic. This is considered to be due to a lower degree of carbon particle coverage with the binder compared with Comparative Battery F.

With regard to the electrode strength, too, all of Example batteries B1–B4 of the present invention were superior to Comparative Example battery F. Furthermore, in the case pressing was performed at 130 degrees C., a negative electrode with a further superior electrode strength was obtained because the binder melts during pressing and solidifies again under the state of being pressed. Also, the reason why the negative electrode of Example batteries B1–B4 of the present invention showed especially high values of strength is considered to be due to the fact that the negative electrode has a highly polar radical, —COOH or —COOCH$_3$, and has hence an enhanced adhesiveness with the metal current collector. Furthermore, it was confirmed that when a part or the whole of —COOH or —COOCH$_3$ radical is substituted with —COO$^-$Na$^+$, K$^+$ to make acrylate and methacrylate, adhesiveness with the core material is enhanced.

Example batteries of the present invention also showed a charge-discharge cycle characteristic which is superior to the Comparative Example battery F. This is considered to be due to the fact that the binder of these batteries does not have double bonds in the primary chains of the polymer and is chemically less reactive to liquid electrolyte thus superior in resistance to liquid electrolyte compared with styrene-butadiene copolymer of the used in Comparative Example battery F.

Table 5 shows the relationships between the average particle size of flaky graphite and battery capacity and between the average particle size of flaky graphite and low-temperature discharge characteristic in Example batteries B1–B4 of the present invention and Comparative Example battery F. The data is for the case of a binder contents of 5 parts by weight relative to 100 parts by weight of the carbon material. Pressing was carried out at 25 degrees C.

TABLE 4

| Battery | B1 | | B2 | | B3 | | B4 | | F | |
|---|---|---|---|---|---|---|---|---|---|---|
| Rolling Temperature (deg C.) | 25 | 130 | 25 | 130 | 25 | 130 | 25 | 130 | 25 | 130 |
| Discharge Capacity at −20 deg C. (mAh) | 105 | 143 | 110 | 147 | 108 | 146 | 106 | 150 | 44 | 47 |
| Electrode Strength | 5 | 6 | 5 | 6 | 5 | 6 | 5 | 6 | 1 | 1 |
| Number of Cycles (cycles) | 508 | 515 | 550 | 559 | 543 | 553 | 526 | 531 | 447 | 430 |

TABLE 5

| Battery | Average Particle Size of Flaky Graphite (μm) | Battery Capacity (mAh) | Discharge Capacity at −20 deg C. (mAh) |
| --- | --- | --- | --- |
| B1 | 1 | 868 | 210 |
|  | 5 | 908 | 155 |
|  | 20 | 924 | 105 |
|  | 30 | 931 | 95 |
|  | 40 | 940 | 30 |
| B2 | 1 | 871 | 205 |
|  | 5 | 911 | 150 |
|  | 20 | 926 | 110 |
|  | 30 | 933 | 95 |
|  | 40 | 943 | 35 |
| B3 | 1 | 869 | 208 |
|  | 5 | 909 | 149 |
|  | 20 | 924 | 108 |
|  | 30 | 932 | 93 |
|  | 40 | 941 | 33 |
| B4 | 1 | 866 | 211 |
|  | 5 | 904 | 153 |
|  | 20 | 919 | 106 |
|  | 30 | 926 | 91 |
|  | 40 | 938 | 32 |
| F | 1 | 859 | 79 |
|  | 5 | 913 | 61 |
|  | 20 | 935 | 44 |
|  | 30 | 938 | 20 |
|  | 40 | 945 | 3 |

As can be seen from Table 5, when the average particle size of the flaky graphite is smaller than 5 μm, the battery capacity decreases significantly as the irreversible capacity of the negative electrode carbon material increases, and when greater than 30 μm, the low-temperature discharge characteristic declines, suggesting that an average particle size range of 5–30 μm of the flaky graphite is preferable.

Table 6 shows the relationships between the binder content in parts by weight in the negative electrode relative to 100 parts by weight of the carbon material and the low-temperature discharge characteristic and between the binder content in parts by weight in the negative electrode relative to 100 parts by weight of the carbon material and the electrode strength of Example batteries B1–B4 of the present invention and Comparative Example battery F. The data is for the case of an average flaky graphite particle size of 20 μm. Pressing was carried out at 25 degrees C.

TABLE 6

| Battery | Binder Content | Discharge Capacity at −20 deg C. (mAh) | Electrode Strength |
| --- | --- | --- | --- |
| B1 | 0.5 | 175 | 3 |
|  | 5 | 105 | 5 |
|  | 8 | 90 | 7 |
|  | 10 | 38 | 10 |
| B2 | 0.5 | 180 | 3 |
|  | 5 | 110 | 5 |
|  | 8 | 96 | 8 |
|  | 10 | 37 | 10 |
| B3 | 0.5 | 178 | 3 |
|  | 5 | 108 | 5 |
|  | 8 | 94 | 7 |
|  | 10 | 37 | 10 |
| B4 | 0.5 | 175 | 3 |
|  | 5 | 106 | 5 |
|  | 8 | 90 | 8 |
|  | 10 | 34 | 10 |
| F | 0.5 | 58 | =0 |
|  | 5 | 44 | 1 |
|  | 8 | 19 | 2 |
|  | 10 | 2 | 2 |

As can be seen from Table 6, when the binder content in parts by weight relative to 100 parts by weight of the carbon material was larger than 8, a significant decline in the low-temperature discharge characteristic was observed, and at 0.5, there was a decrease in the electrode strength. Therefore, the preferable range of the binder content in parts by weight relative to 100 parts by weight of the carbon material is 0.5–8.

Now, with regard to the temperature of heat treatment of the negative electrode after pressing, enough electrode strength is not obtained at or below the melting point of the negative electrode binder as the binder does not melt, and the electrode strength decreases at or above the decomposition temperature of the binder as the binder decomposes. Therefore, an electrode with a superior electrode strength can be obtained by heat treatment at a temperature between the melting point and decomposition temperature of the binder. Same thing applies to the pressing temperature of the negative electrode.

Though a description has been made of use of one type of binder in each Example of the present invention, it is obvious that similar result will be obtained by using a mixture of two or more types. It is also obvious that similar result will be obtained when the binder is used blended with polyethylene and polypropylene.

Table 7 shows the low-temperature discharge characteristic, electrode strength, and charge-discharge cycle characteristic of the Example batteries C1–C4 of the present invention and Comparative battery F. The data is for the case of an average flaky graphite particle size of 20 μm and the binder content of 5 parts by weight relative to 100 parts by weight of the carbon material.

TABLE 7

| Battery | C1 | | C2 | | C3 | | C4 | | F | |
| --- | --- | --- | --- | --- | --- | --- | --- | --- | --- | --- |
| Rolling Temperature (deg C.) | 25 | 130 | 25 | 130 | 25 | 130 | 25 | 130 | 25 | 130 |
| Discharge Capacity at −20 deg C. (mAh) | 170 | 204 | 185 | 225 | 170 | 200 | 180 | 223 | 44 | 47 |
| Electrode Strength | 3 | 4 | 4 | 5 | 4 | 5 | 4 | 4 | 1 | 1 |
| Number of Cycles (cycles) | 516 | 527 | 530 | 540 | 522 | 531 | 521 | 539 | 447 | 430 |

As shown in Table 7, all of Example batteries C1–C4 of the present invention exhibited a characteristic superior to Comparative Example battery F in the low-temperature discharge characteristic. This is considered to be due to a lower degree of coverage of the carbon particles with the binder compared with Comparative Example battery F.

With regard to the electrode strength, too, all of Example batteries C1–C4 of the present invention were superior to Comparative Example battery F. Furthermore, in the case pressing was performed at 130 degrees C., a negative electrode with a further superior electrode strength was obtained because the negative binder of the present invention melts during pressing and solidifies again under the state of being pressed thus enhancing the binding property. Also, the reason why the negative electrode of Example batteries C1–C4 of the present invention showed especially high values of strength is considered to be due to the fact that the negative electrode has a highly polar radical, —COOH or —COOCH$_3$. Furthermore, it was confirmed that when a part or the whole of —COOH or —COOCH$_3$ radical is substituted with —COO$^-$Na$^+$, K$^+$ to make acrylate and methacrylate, adhesiveness with the core material is further enhanced.

Example batteries of the present invention also showed a charge-discharge cycle characteristic which is superior to Comparative Example battery F. This is considered to be due to the fact that the binder of these batteries does not have double bonds in the primary chains of the polymer and is chemically less reactive to liquid electrolyte thus superior in resistance compared with styrene-butadiene copolymer of the binder used in Comparative Example battery F.

Table 8 shows the low-temperature discharge characteristic and electrode strength for various ethylene contents of the ethylene-acrylic acid copolymer in Example batteries C1–C4 of the present invention. The data is for the case of an average particle size of 20 μm of the flaky graphite and a binder content of 5 parts by weight relative to 100 parts by weight of the carbon material. Pressing was carried out at 25 degrees C.

TABLE 8

| Battery | Ethylene Content (%) | Discharge Capacity at −20 deg C. (mAh) | Electrode Strength |
|---|---|---|---|
| C1 | 60 | 102 | 5 |
|  | 70 | 161 | 3 |
|  | 80 | 170 | 3 |
|  | 95 | 230 | 2 |
|  | 98 | 256 | 1 |
| C2 | 60 | 105 | 5 |
|  | 70 | 167 | 4 |
|  | 80 | 185 | 4 |
|  | 95 | 234 | 2 |
|  | 98 | 268 | 1 |
| C3 | 60 | 98 | 5 |
|  | 70 | 159 | 4 |
|  | 80 | 170 | 4 |
|  | 95 | 228 | 3 |
|  | 98 | 254 | 1 |
| C4 | 60 | 102 | 5 |
|  | 70 | 162 | 4 |
|  | 80 | 180 | 4 |
|  | 95 | 234 | 2 |
|  | 98 | 266 | 1 |

As shown in table 8, through the low-temperature discharge capacity increased with increasing ethylene content, the electrode strength decreased conversely. Consequently, it is preferable to keep the ethylene content of the ethylene-acrylic acid copolymer in the range 70–95%.

Table 9 shows the relationships between the average particle size of flaky graphite and battery capacity and between the average particle size of flaky graphite and low-temperature discharge characteristic in Example batteries C1–C4 of the present invention and Comparative battery F. The data is for the case of a binder content of 5 parts by weight relative to 100 parts by weight of the carbon material. Pressing was carried out at 25 degrees C.

TABLE 9

| Battery | Average Particle Size of Flaky Graphite (μm) | Battery Capacity (mAh) | Discharge Capacity at −20 degC (mAh) |
|---|---|---|---|
| C1 | 1 | 863 | 218 |
|  | 5 | 914 | 200 |
|  | 20 | 922 | 170 |
|  | 30 | 932 | 155 |
|  | 40 | 944 | 71 |
| C2 | 1 | 867 | 230 |
|  | 5 | 921 | 205 |
|  | 20 | 930 | 185 |
|  | 30 | 934 | 159 |
|  | 40 | 941 | 75 |
| C3 | 1 | 866 | 211 |
|  | 5 | 921 | 195 |
|  | 20 | 933 | 170 |
|  | 30 | 935 | 158 |
|  | 40 | 944 | 69 |
| C4 | 1 | 866 | 233 |
|  | 5 | 922 | 208 |
|  | 20 | 933 | 180 |
|  | 30 | 938 | 155 |
|  | 40 | 946 | 72 |
| F | 1 | 859 | 79 |
|  | 5 | 913 | 61 |
|  | 20 | 935 | 44 |
|  | 30 | 938 | 20 |
|  | 40 | 945 | 3 |

As can be seen from Table 9, when the average particle size of the flaky graphite is smaller than 5 μm, the battery capacity decreases significantly as the irreversible capacity of the negative electrode carbon material increases, and when greater than 30 μm, the low-temperature discharge characteristic declines, suggesting that an average particle size range of 5–30 μm of the flaky graphite is preferable.

Table 10 shows the relationships between the binder content in parts by weight in the negative electrode relative to 100 parts by weight of the carbon material and the low-temperature discharge characteristic and between the binder content in parts by weight of the negative electrode relative to 100 parts by weight of the carbon material and the electrode strength of Example batteries C1–C4 of the present invention and Comparative Example battery F. The data is for the case of an average flaky graphite particle size of 20 μm. Pressing was carried out at 25 degrees C.

TABLE 10

| Battery | Binder Content | Discharge Capacity at −20 degC (mAh) | Electrode Strength |
|---|---|---|---|
| C1 | 0.5 | 198 | 2 |
|  | 5 | 170 | 3 |
|  | 8 | 158 | 5 |
|  | 10 | 93 | 8 |

TABLE 10-continued

| Battery | Binder Content | Discharge Capacity at −20 degC (mAh) | Electrode Strength |
|---|---|---|---|
| C2 | 0.5 | 210 | 3 |
|  | 5 | 185 | 4 |
|  | 8 | 168 | 7 |
|  | 10 | 100 | 10 |
| C3 | 0.5 | 201 | 3 |
|  | 5 | 170 | 4 |
|  | 8 | 160 | 7 |
|  | 10 | 98 | 10 |
| C4 | 0.5 | 205 | 3 |
|  | 5 | 180 | 4 |
|  | 8 | 164 | 6 |
|  | 10 | 97 | 9 |
| F | 0.5 | 58 | =0 |
|  | 5 | 44 | 1 |
|  | 8 | 19 | 2 |
|  | 10 | 2 | 2 |

As can be seen from Table 10, when the binder content in parts by weight relative to 100 parts by weight of the carbon material was larger than 8, a significant decline in the low-temperature discharge characteristic was observed, and at 0.5 there was a decrease in the electrode strength. Therefore, the preferable range of the binder content in parts by weight relative to 100 parts by weight of the carbon material is 0.5–8.

Now, with regard to the temperature of heat treatment of the negative electrode after pressing, enough electrode strength is not obtained at or below the melting point of the negative electrode binder as the binder does not melt, and the electrode strength decreases at or above the decomposition temperature of the binder as the binder decomposes. Therefore, an electrode with a superior electrode strength can be obtained by heat treatment at a temperature between the melting point and decomposition temperature of the binder. Same thing applies to the pressing temperature of the negative electrode.

Though a description has been made of use of one type of binder in each Example of the present invention, it is obvious that similar result will be obtained by using a mixture of two or more types. It is also obvious that similar result will be obtained when the binder is used blended with polyethylene and polypropylene.

Table 11 shows the low-temperature discharge characteristic, electrode strength, and charge-discharge cycle characteristic of the Example batteries D1–D4 of the present invention and Comparative Battery F. The data is for the case of an average flaky graphite particle size of 20 μm and the binder content of 5 parts by weight relative to 100 parts by weight of the carbon material.

As shown in Table 11, all of the Example batteries D1–D4 of the present invention exhibited a characteristic superior to Comparative Example battery F in the low-temperature discharge characteristic. This is considered to be due to a lower degree of coverage of the carbon particles with the binder compared with Comparative Example battery F.

With regard to the electrode strength, too, all of Example batteries D1–D4 of the present invention were superior to Comparative Example battery F. Furthermore, in the case pressing was performed at 130 degrees C., a negative electrode with a further superior electrode strength was obtained because the negative binder of the present invention melts during pressing and solidifies again under the state of being pressed thus enhancing the binding property. Also, the reason why the negative electrode of Example batteries D1–D4 of the present invention showed especially high values of strength is considered to be due to the fact that the negative electrode has a highly polar radical, —COOH or —COOCH$_3$. Furthermore, it was confirmed that when a part or the whole of —COOH or —COOCH$_3$ radicals is substituted with —COO$^-$Na$^+$, K$^+$ to make acrylate and methacrylate, adhesiveness with the core material is further enhanced.

Example batteries of the present invention also showed a charge-discharge cycle characteristic which is superior to the Comparative Example battery F. This is considered to be due to the fact that the binder of these batteries does not have double bonds in the primary chain of the polymer and is chemically less reactive to liquid electrolyte thus superior in resistance to liquid electrolyte compared with styrene-butadiene copolymer of the binder used in Comparative Example battery F.

Table 12 shows the relationships between the average particle size of flaky graphite and battery capacity and between the average particle size of flaky graphite and low-temperature discharge characteristic in Example batteries D1–D4 of the present invention and Comparative Example battery F. The data is for the case of a binder content of 5 parts by weight relative to 100 parts by weight of the carbon material. Pressing was carried out at 25 degrees C.

TABLE 12

| Battery | Average Particle Size of Flaky Graphite (μm) | Battery Capacity (mAh) | Discharge Capacity at −20 degC (mAh) |
|---|---|---|---|
| D1 | 1 | 863 | 207 |
|  | 5 | 920 | 195 |
|  | 20 | 930 | 173 |
|  | 30 | 936 | 141 |
|  | 40 | 946 | 70 |

TABLE 11

| Battery | D1 | | D2 | | D3 | | D4 | | F | |
|---|---|---|---|---|---|---|---|---|---|---|
| Rolling Temperature (deg C.) | 25 | 130 | 25 | 130 | 25 | 130 | 25 | 130 | 25 | 130 |
| Discharge Capacity at −20 deg C. (mAh) | 173 | 208 | 187 | 224 | 175 | 200 | 186 | 222 | 44 | 47 |
| Electrode Strength | 4 | 4 | 4 | 5 | 4 | 4 | 4 | 5 | 1 | 1 |
| Number of Cycles (cycles) | 535 | 540 | 527 | 540 | 531 | 529 | 537 | 547 | 447 | 430 |

TABLE 12-continued

| Battery | Average Particle Size of Flaky Graphite ($\mu$m) | Battery Capacity (mAh) | Discharge Capacity at −20 degC (mAh) |
|---|---|---|---|
| D2 | 1 | 861 | 217 |
|  | 5 | 919 | 202 |
|  | 20 | 929 | 187 |
|  | 30 | 932 | 154 |
|  | 40 | 940 | 80 |
| D3 | 1 | 868 | 209 |
|  | 5 | 921 | 196 |
|  | 20 | 938 | 175 |
|  | 30 | 940 | 147 |
|  | 40 | 945 | 75 |
| D4 | 1 | 870 | 220 |
|  | 5 | 922 | 204 |
|  | 20 | 937 | 186 |
|  | 30 | 942 | 155 |
|  | 40 | 948 | 79 |
| F | 1 | 859 | 79 |
|  | 5 | 913 | 61 |
|  | 20 | 935 | 44 |
|  | 30 | 938 | 20 |
|  | 40 | 945 | 3 |

As can be seen from Table 12, when the average particle size of the flaky graphite is smaller than 5 $\mu$m, the battery capacity decreases significantly as the irreversible capacity of the negative electrode carbon material increases, and when greater than 30 $\mu$m, the low-temperature discharge characteristic declines suggesting that an average particle size range of 5–30 $\mu$m of the flaky graphite is preferable.

Table 13 shows the relationships between the binder content in parts by weight relative to 100 parts by weight of the carbon material of the negative electrode and the low-temperature discharge characteristic and between the binder content in parts by weight relative to 100 parts by weight of the carbon material of the negative electrode and the electrode strength of Example batteries D1–D4 of the present invention and Comparative Example battery F. The data is for the case of an average particle size of flaky graphite of 20 $\mu$m. Pressing was carried out at 25 degrees C.

TABLE 13

| Battery | Binder Content | Discharge Capacity at −20 degC (mAh) | Electrode Strength |
|---|---|---|---|
| D1 | 0.5 | 206 | 3 |
|  | 5 | 173 | 4 |
|  | 8 | 162 | 7 |
|  | 10 | 99 | 9 |
| D2 | 0.5 | 219 | 3 |
|  | 5 | 187 | 4 |
|  | 8 | 171 | 7 |
|  | 10 | 105 | 9 |
| D3 | 0.5 | 207 | 3 |
|  | 5 | 175 | 4 |
|  | 8 | 166 | 8 |
|  | 10 | 100 | 10 |
| D4 | 0.5 | 220 | 3 |
|  | 5 | 186 | 4 |
|  | 8 | 170 | 8 |
|  | 10 | 103 | 10 |
| F | 0.5 | 58 | =0 |
|  | 5 | 44 | 1 |
|  | 8 | 19 | 2 |
|  | 10 | 2 | 2 |

As can be seen from Table 13, when the binder content in parts by weight relative to 100 parts by weight of the carbon material was greater than 8, a significant decline in the low-temperature discharge characteristic was observed, and at 0.5 there was a decrease in the electrode strength, suggesting that the preferable range of the ratio between the carbon material and the binder is 0.5–8 parts by weight relative to 100 parts by weight of the carbon material.

Now, with regard to the temperature of heat treatment of the negative electrode after pressing, enough electrode strength is not obtained at or below the melting point of the negative electrode binder as the binder does not melt, and the electrode strength decreases at or above the decomposition temperature of the binder as the binder decomposes. Therefore, an electrode with a superior electrode strength can be obtained by heat treatment at a temperature between the melting point and decomposition temperature of the binder. Same thing applies to the pressing temperature of the negative electrode.

Though a description has been made of use of one type of binder in each Example of the present invention, it is obvious that similar result will be obtained by using a mixture of two or more types. It is also obvious that similar result will be obtained by using the binder blended with polyethylene and polypropylene.

Table 14 shows the low-temperature discharge characteristic, electrode strength, and charge-discharge cycle characteristic of the Example batteries E1–E8 of the present invention and Comparative Battery F. The data is for the case of an average flaky graphite particle size of 20 $\mu$m and the binder content of 5 parts by weight relative to 100 parts by weight of the carbon material.

TABLE 14

| Battery | E1 | | E2 | | E3 | | E4 | | E5 | | E6 | | E7 | | E8 | | F | |
|---|---|---|---|---|---|---|---|---|---|---|---|---|---|---|---|---|---|---|
| Rolling Temperature (deg C.) | 25 | 130 | 25 | 130 | 25 | 130 | 25 | 130 | 25 | 130 | 25 | 130 | 25 | 130 | 25 | 130 | 25 | 130 |
| Discharge Capacity at −20 deg C. (mAh) | 190 | 227 | 187 | 214 | 178 | 203 | 183 | 212 | 178 | 205 | 181 | 218 | 177 | 209 | 175 | 211 | 44 | 47 |
| Electrode Strength | 4 | 5 | 4 | 4 | 4 | 5 | 4 | 4 | 3 | 4 | 4 | 5 | 4 | 5 | 3 | 4 | 1 | 1 |
| Number of Cycles (cycles) | 341 | 329 | 335 | 341 | 322 | 309 | 339 | 343 | 317 | 333 | 321 | 338 | 304 | 308 | 315 | 322 | 447 | 430 |

In the low-temperature discharge characteristic, all of Example batteries E1–E8 of the present invention exhibited a characteristic superior to Comparative Example battery F as shown in Table 14. This is considered to be due to a lower degree of coverage of the carbon particles with the binder compared with Comparative Example battery F.

With regard to the electrode strength, too, all of Example batteries E1–E8 of the present invention were superior to Comparative Example battery F. Furthermore, in the case pressing was performed at 130 degrees C., a negative electrode with a further superior electrode strength was obtained because the negative binder of the present invention melts during pressing and solidifies again under the state of being pressed thus enhancing the binding property. Also, the reason why the negative electrode of Example batteries E1–E8 of the present invention showed especially high values of strength is considered to be due to the fact that the negative electrode has a highly polar radical, —COOH or —COOCH$_3$. Furthermore, it was confirmed that when a part or the whole of —COOH or —COOCH$_3$ radical is substituted with —COO$^-$Na$^+$, K$^+$ to make acrylate and methacrylate, adhesiveness with the core material is further enhanced.

Example batteries of the present invention showed a charge-discharge cycle characteristic which is inferior to the Comparative Example battery F. While the reason is not clear, it is assumed that, in view of the superiority of the binder in the resistance to liquid electrolyte, elasticity of the resin has decreased by copolymerization of styrene causing a physical stress due to expansion and shrinkage of the carbon material.

Table 15 shows the relationships between the average particle size of flaky graphite and battery capacity and between the average particle size of flaky graphite and low-temperature discharge characteristic in Example batteries E1–E8 of the present invention and Comparative Example battery F. The data is for the case of a binder content of 5 parts by weight to 100 parts by weight of the carbon material. Pressing was carried out at 25 degrees C.

TABLE 15

| Battery | Average Particle Size of Flaky Graphite ($\mu$m) | Battery Capacity (mAh) | Discharge Capacity at -20 degC (mAh) |
|---|---|---|---|
| E1 | 1 | 874 | 234 |
|  | 5 | 922 | 214 |
|  | 20 | 930 | 190 |
|  | 30 | 938 | 165 |
|  | 40 | 947 | 79 |
| E2 | 1 | 873 | 230 |
|  | 5 | 918 | 209 |
|  | 20 | 927 | 187 |
|  | 30 | 935 | 164 |
|  | 40 | 944 | 78 |
| E3 | 1 | 872 | 212 |
|  | 5 | 923 | 199 |
|  | 20 | 936 | 178 |
|  | 30 | 942 | 159 |
|  | 40 | 945 | 77 |
| E4 | 1 | 875 | 229 |
|  | 5 | 920 | 205 |
|  | 20 | 930 | 183 |
|  | 30 | 937 | 163 |
|  | 40 | 948 | 74 |
| E5 | 1 | 873 | 222 |
|  | 5 | 922 | 203 |
|  | 20 | 931 | 178 |
|  | 30 | 939 | 159 |
|  | 40 | 948 | 69 |

TABLE 15-continued

| Battery | Average Particle Size of Flaky Graphite ($\mu$m) | Battery Capacity (mAh) | Discharge Capacity at -20 degC (mAh) |
|---|---|---|---|
| E6 | 1 | 871 | 227 |
|  | 5 | 919 | 208 |
|  | 20 | 928 | 181 |
|  | 30 | 936 | 169 |
|  | 40 | 946 | 74 |
| E7 | 1 | 877 | 220 |
|  | 5 | 924 | 201 |
|  | 20 | 932 | 177 |
|  | 30 | 938 | 167 |
|  | 40 | 947 | 71 |
| E8 | 1 | 875 | 216 |
|  | 5 | 922 | 197 |
|  | 20 | 929 | 175 |
|  | 30 | 936 | 163 |
|  | 40 | 943 | 68 |
| F | 1 | 859 | 79 |
|  | 5 | 913 | 61 |
|  | 20 | 935 | 44 |
|  | 30 | 938 | 20 |
|  | 40 | 945 | 3 |

As can be seen from Table 15, when the average particle size of the flaky graphite is smaller than 5 $\mu$m, the battery capacity decreases significantly as the irreversible capacity of the negative electrode carbon material increases, and when greater than 30 $\mu$m, the low-temperature discharge characteristic declines, suggesting that an average particle size range of 5–30 $\mu$m of the flaky graphite is preferable.

Table 16 shows the relationships between the binder content in parts by weight relative to 100 parts by weight of the carbon material of the negative electrode and the low-temperature discharge characteristic and between the binder content in parts by weight relative to 100 parts by weight of the carbon material of the negative electrode and the electrode strength of Example batteries E1–E8 of the present invention and Comparative Example battery F. The data is for the case of an average flaky graphite particle size of 20 $\mu$m. Pressing was carried out at 25 degrees C.

TABLE 16

| Battery | Binder Content | Discharge Capacity at -20 degC (mAh) | Electrode Strength |
|---|---|---|---|
| E1 | 0.5 | 231 | 3 |
|  | 5 | 190 | 4 |
|  | 8 | 176 | 6 |
|  | 10 | 104 | 9 |
| E2 | 0.5 | 226 | 3 |
|  | 5 | 187 | 4 |
|  | 8 | 171 | 6 |
|  | 10 | 100 | 10 |
| E3 | 0.5 | 213 | 3 |
|  | 5 | 178 | 4 |
|  | 8 | 166 | 6 |
|  | 10 | 87 | 10 |
| E4 | 0.5 | 222 | 3 |
|  | 5 | 183 | 4 |
|  | 8 | 169 | 6 |
|  | 10 | 98 | 9 |
| E5 | 0.5 | 216 | 2 |
|  | 5 | 178 | 3 |
|  | 8 | 164 | 4 |
|  | 10 | 92 | 8 |
| E6 | 0.5 | 221 | 3 |
|  | 5 | 181 | 4 |
|  | 8 | 168 | 5 |
|  | 10 | 94 | 9 |

TABLE 16-continued

| Battery | Binder Content | Discharge Capacity at −20 degC (mAh) | Electrode Strength |
|---|---|---|---|
| E7 | 0.5 | 220 | 3 |
|  | 5 | 177 | 4 |
|  | 8 | 169 | 6 |
|  | 10 | 96 | 10 |
| E8 | 0.5 | 211 | 2 |
|  | 5 | 175 | 3 |
|  | 8 | 162 | 4 |
|  | 10 | 92 | 7 |
| F | 0.5 | 58 | =0 |
|  | 5 | 44 | 1 |
|  | 8 | 19 | 2 |
|  | 10 | 2 | 2 |

As can be seen from Table 16, when the binder content in parts by weight relative to 100 parts by weight of the carbon material is larger than 8, a significant decrease in the low-temperature discharge characteristic was observed, and at 0.5, there was a decrease in the electrode strength. Therefore, the preferable range of the binder content in parts by weight relative to 100 parts by weight of the carbon material is 0.5–8.

Now, with regard to the temperature of heat treatment of the negative electrode after pressing, enough electrode strength is not obtained at or below the melting point of the negative electrode binder as the binder does not melt, and the electrode strength decreases at or above the decomposition temperature of the binder as the binder decomposes. Therefore, an electrode with a superior electrode strength can be obtained by heat treatment at a temperature between the melting point and decomposition temperature of the binder. Same thing applies to the pressing temperature of the negative electrode.

Though a description has been made of use of one type of binder in each Example of the present invention, it is obvious that similar result will be obtained by using a mixture of two or more types. It is also obvious that similar result will be obtained when the binder is used blended with polyethylene and polypropylene.

In the examples of the present invention, though flaky graphite was used as the negative electrode carbon material, similar effects were obtained irrespective of the type and configuration of the carbon materials.

Also, while $LiCoO_2$ was employed as the positive active material, similar effects were obtained by employing other positive active material such as $LiNiO_2$ or $LiMn_2O_4$.

INDUSTRIAL APPLICATION

As has been described above, the present invention provide a negative electrode which is superior in the low-temperature discharge characteristic and in the strength against peeling of the electrode mix, and, through use of the negative electrode, it also provides a non-aqueous electrolyte secondary battery which is superior in the ease of handling in mass production, high in reliability, and superior in discharge characteristic.

What is claimed is:

1. A non-aqueous electrolyte secondary battery comprising a rechargeable positive electrode, a non-aqueous liquid electrolyte, and a negative electrode comprising a negative electrode material;

in which:

the negative electrode material comprises (1) a carbon material that is capable of absorbing and desorbing lithium and (2) a binder;

the carbon material is a graphite material;

the binder is at least one material selected from the group consisting of ethylene-acrylic acid copolymers, ethylene-acrylate copolymers, ethylene-methyl acrylic acid copolymers, ethylene-methacrylic acid copolymers, ethylene-methacrylate copolymers, and ethylene-methyl methacrylic acid copolymers; and;

the ethylene content of the binder is in the range of 70–95%.

2. The non-aqueous electrolyte secondary battery of claim 1 wherein said carbon material is a graphite material having an average particle size in the range 5–30 μm.

3. The non-aqueous electrolyte secondary battery of claim 1 wherein the ratio between said carbon material an said binder is such that the binder content is in the range of 0.5–8 parts by weight relative to 100 parts by weight of the carbon material.

4. The non-aqueous electrolyte secondary battery of claim 3 wherein said carbon material is a graphite material having an average particle size in the range 5–30 μm.

5. The non-aqueous electrolyte secondary battery of claim 4 wherein the binder is at least one material selected from the group consisting of ethylene-acrylic acid copolymers, ethylene-methyl acrylic acid copolymers, ethylene-methacrylic acid copolymers, and ethylene-methyl methacrylic acid copolymers.

6. The non-aqueous electrolyte secondary battery of claim 1 wherein the binder is at least one material selected from the group consisting of ethylene-acrylic acid copolymers, ethylene-methyl acrylic acid copolymers, ethylene-methacrylic acid copolymers, and ethylene-methyl methacrylic acid copolymers.

7. The non-aqueous electrolyte secondary battery of claim 2 wherein the binder is at least one material selected from the group consisting of ethylene-acrylic acid copolymers, ethylene-methyl acrylic acid copolymers, ethylene-methacrylic acid copolymers, and ethylene-methyl methacrylic acid copolymers.

8. The non-aqueous electrolyte secondary battery of claim 1 wherein the rechargeable positive electrode comprises a lithiated transition metal oxide as a positive active material.

9. The non-aqueous electrolyte secondary battery of claim 4 wherein the rechargeable positive electrode comprises a lithiated transition metal oxide as a positive active material selected.

10. The non-aqueous electrolyte secondary battery of claim 2 wherein the binder comprises —COO⁻Na⁺ or —COO⁻K⁺ groups.

11. The non-aqueous electrolyte secondary battery of claim 3 wherein the binder comprises —COO⁻Na⁺ or —COO⁻ K⁺ groups.

12. The non-aqueous electrolyte secondary battery of claim 11 wherein the binder comprises —COO⁻Na⁺ or —COO⁻K⁺ groups.

13. The non-aqueous electrolyte secondary battery of claim 4 wherein the binder comprises —COO⁻Na⁺ or —COO⁻K⁺ groups.

14. The non-aqueous electrolyte secondary battery of claim 8 wherein the positive active material is selected from the group consisting of $LiCoO_2$, $LiNiO_2$, and $LiMn_2O_4$.

15. The non-aqueous electrolyte secondary battery of claim 9 wherein the positive active material is selected from the group consisting of $LiCoO_2$, $LiNiO_2$, and $LiMn_2O_4$.

16. The non-aqueous electrolyte secondary battery of claim 4 wherein the binder is blended with polyethylene or polypropylene.

17. The non-aqueous electrolyte secondary battery of claim 1 wherein the binder is blended with polyethylene or polypropylene.

18. A method of manufacturing a non-aqueous electrolyte secondary battery negative electrode comprising a negative electrode material, the negative electrode material comprising a carbon material which is capable of absorbing and desorbing lithium and a binder;

wherein said carbon material is a graphite material, said binder is at least one material selected from the group consisting of ethylene-acrylic acid copolymers, ethylene-acrylate copolymers, ethylene-methyl acrylic acid copolymers, ethylene-methacrylic acid copolymers, ethylene-methacrylate copolymers, and ethylene-methyl methacrylic acid copolymers and, the ethylene content of said binder is in the range of 70–95%;

the method comprising the steps of:
coating a mixture of said carbon material and said binder on a current collector, drying and pressing said mixture, and heat treating said mixture at a temperature between the melting point and the decomposition temperature of said binder, or pressing said mixture at a temperature between the melting point and the decomposition temperature of said binder.

19. The method of claim 18 wherein the ratio between said carbon material and said binder is such that the binder content is in the range of 0.5–8 parts by weight relative to 100 parts by weight of the carbon material.

20. The method of claim 18 wherein said carbon material is a graphite material having an average particle size in the range 5–30 μm.

21. The method of claim 19 wherein said carbon material is a graphite material having an average particle size in the range 5–30 μm.

22. The method of claim 21 wherein the binder comprises —COO$^-$ Na$^+$ or —COO$^-$ K$^+$ groups.

* * * * *

UNITED STATES PATENT AND TRADEMARK OFFICE
CERTIFICATE OF CORRECTION

PATENT NO.    : 6,436,573 B1
DATED         : August 20, 2002
INVENTOR(S)   : Shusaku Goto et al.

It is certified that error appears in the above-identified patent and that said Letters Patent is hereby corrected as shown below:

<u>Column 24,</u>
Line 14, "an" should be -- and --.
Line 51, "11" should be -- 1 --.

Signed and Sealed this

Sixth Day of May, 2003

JAMES E. ROGAN
*Director of the United States Patent and Trademark Office*